United States Patent
Pickles

[11] 3,845,982
[45] Nov. 5, 1974

[54] SAFETY SEAT TRACK CONSTRUCTION
[75] Inventor: Joseph Pickles, Birmingham, Mich.
[73] Assignee: Ferro Manufacturing Corporation, Detroit, Mich.
[22] Filed: June 29, 1973
[21] Appl. No.: 374,896

[52] U.S. Cl............................................. 296/65 A
[51] Int. Cl............................................. B60n 1/08
[58] Field of Search........ 296/65 A, 65 R; 308/3 R, 308/3.8, 3.6; 297/216

[56] References Cited
UNITED STATES PATENTS

| | | | |
|---|---|---|---|
| 1,716,316 | 6/1929 | Lanning | 296/65 R |
| 2,266,200 | 12/1941 | Hedley | 296/65 R |
| 2,919,744 | 1/1960 | Tanaka | 296/65 R |
| 3,212,828 | 10/1965 | Pickles | 308/3.8 |
| 3,228,732 | 1/1966 | Peras | 308/3 R |
| 3,491,979 | 1/1970 | Wonell | 296/65 R |
| 3,524,677 | 8/1970 | Louton, Jr. | 297/216 |

Primary Examiner—Robert B. Reeves
Assistant Examiner—Charles A. Marmon
Attorney, Agent, or Firm—Whittemore, Hulbert & Belknap

[57] ABSTRACT

The safety seat track construction comprises a track, a seat supporting slide movable longitudinally on the track, a seat connected to the slide, a seat belt connected to the slide, and a safety strap extending transversely over the slide adjacent the rear end thereof to limit upward motion of the rear end of the slide in the event of collision.

2 Claims, 2 Drawing Figures

PATENTED NOV 5 1974

3,845,982

SAFETY SEAT TRACK CONSTRUCTION

BRIEF SUMMARY OF THE INVENTION

The present invention represents an improvement over my prior U.S. Pat. No. 3,212,828, in which means were provided to prevent separation between a track and a seat supporting slide.

The present invention comprises a track adapted to be securely fixed to the floor of a vehicle to extend longitudinally thereof. A seat supporting slide is movably mounted on the track and the mounting means may if desired, include means for separately adjusting the front and the rear of the seat support structure vertically. In the illustrated construction however, the only adjustment is a longitudinal adjustment.

The vehicle seat is fixedly secured to the slide and the slide also carries a seat belt connection.

In the event of collision, when the seat belt is fastened, relatively great forces may be developed tending to raise the rear end of the slide and it is found that upward movement of the rear end of the slide can better be restrained by means attached directly to the floor of the vehicle, rather than to the track.

In the present invention this means comprises a strap fixedly and strongly secured at its ends to the floor of the vehicle and having an intermediate portion which extends over the slide and under the seat which is secured to the slide, in a position which permits adjustment of the slide on the track. The location of the strap is adjacent the rear of the slide and slightly forwardly of the rear end of the slide when the slide is in its foremost position.

DETAILED DESCRIPTION

Figure 1:
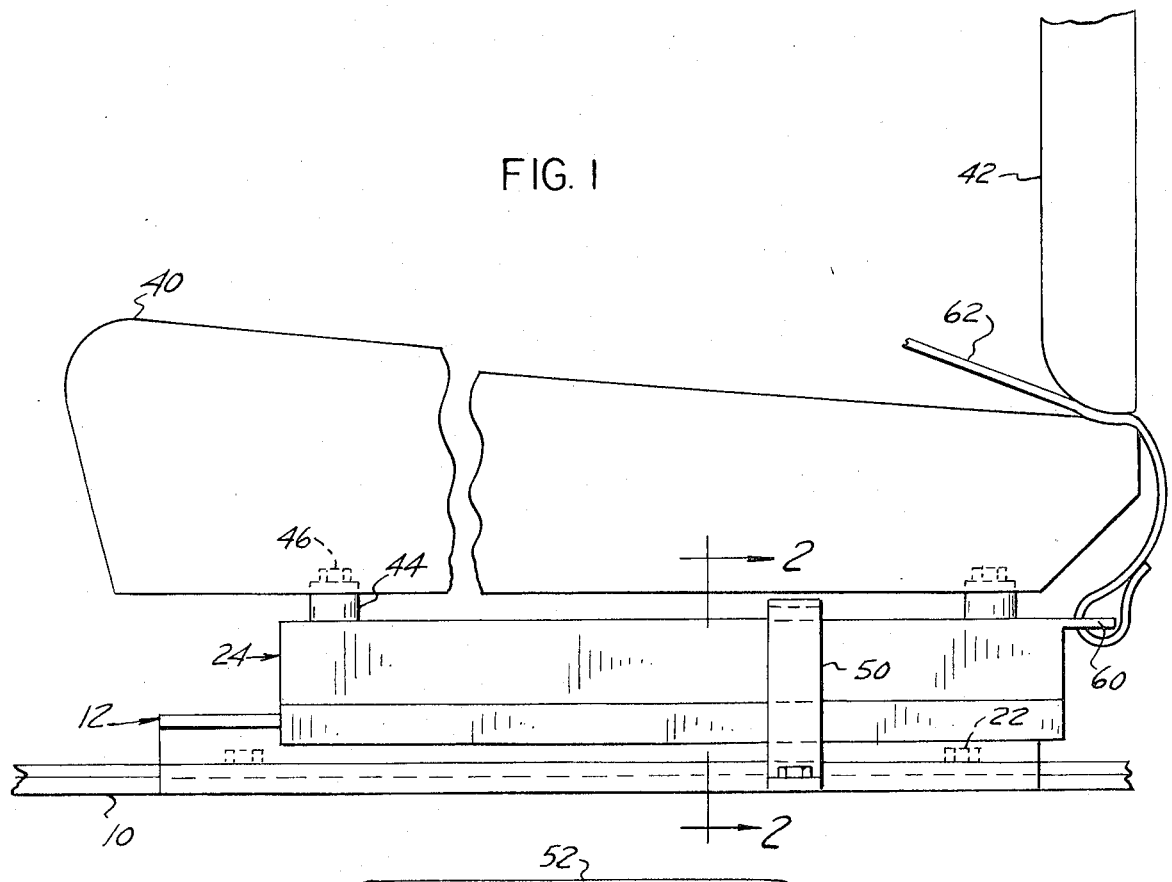
FIG. 1 is a fragmentary side elevation of the safety seat track construction.
Figure 2:
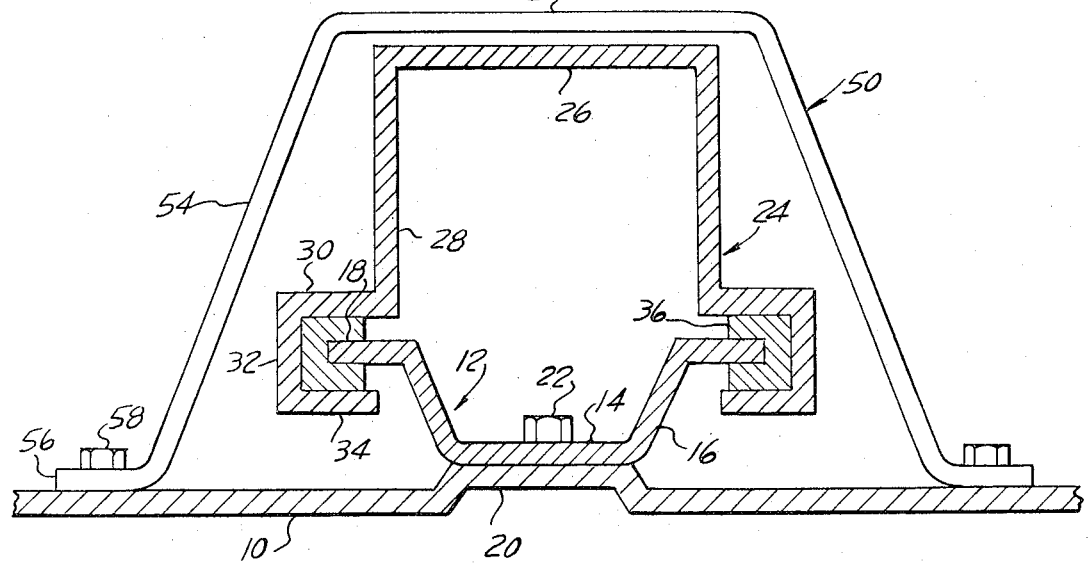
FIG. 2 is an enlarged sectional view on the line 2—2, FIG. 1.

In the Figures the floor of the vehicle is indicated diagrammatically by the line 10 and it will be understood that this may include the vehicle frame members which support the floor. Secured to the floor of the vehicle is a track construction 12 as illustrated, in the form of a channel having a bottom wall 14, a pair of outwardly inclined side walls 16, and laterally outwardly extending flanges 18. The track 12 may be secured to the floor, or more particularly, to an upwardly shaped rib 20 by suitable means such for example as screws or bolts indicated at 22.

Mounted for sliding movement longitudinally of the track 12 is a slide member indicated generally at 24 in the form of an inverted channel having a top wall 26, side walls 28, and outwardly, inwardly and reversely extending walls 30, 32 and 34 together defining two inwardly extending channels which receive the outwardly extending flanges 18 of the track 12. Suitable bearing means such for example as a low friction polymeric material indicated at 36 embraces the flanges 18 and mounts the slide 24 for relatively free longitudinal sliding movement on the track 12.

It will be understood that in the usual construction a pair of tracks and slides are provided to support opposite ends of a seat, the seat being indicated generally at 40 and including a seat back 42. The seat is secured to the slide by suitable means indicated at 44 and including screws or bolts 46. The bottom of the seat is spaced somewhat above the upper edge of the slide 24 and a strap is provided having an upper horizontal section 52 which extends across the top of the slide 24. The strap 50 is provided with downwardly and outwardly extending legs 54 terminating in outwardly, horizontally extending flanges 56 by means of which the strap is directly secured to the floor 10 or a frame portion supporting the floor, by suitable means such as screws or bolts as indicated at 58.

Attached to the rear of the slides 24 are brackets 60 supporting the ends of seat belts 62.

In the event of a collision, while the seat belts are being worn by a passenger in the vehicle, the geometry of the seat belt is such that the momentum of the passenger, applied to the slide 24 through the seat belt 62, tends to move the rear end of the seat supporting slide 24 upwardly. The strap 50, which may be a 2-inch wide metal strap, is in position to be engaged by the rear portion of the slide upon minimal upward movement. Since the strap 50 is directly secured to the floor of the vehicle or frame elements of the vehicle which support the floor, it is most effective to prevent upward movement of the slide and hence, to prevent forces generated by the collision from permitting upward movement of the slide and hence, upward and forward movement of the passenger.

What I claim as my invention is:

1. A simplified safety seat construction for two-way adjustment comprising a longitudinally extending track fixedly secured to the floor of a vehicle, said track having laterally outwardly extending flanges spaced above the vehicle floor, an elongated seat supporting slide movable longitudinally along said track, seat belts secured to said slide adjacent the rear thereof, said slide being of inverted channel shape having a top wall and depending side walls terminating at the bottom edges thereof in inwardly facing confronting flange receiving channels, low friction slide bearings in said channels surrounding the outer edges of said flanges, a seat, detachable fasteners fixing said seat to said slide adjacent the front and rear ends thereof carried by said slide, and a safety strap of inverted channel-shape fixedly secured to the floor of the vehicle adjacent the rear end of said track and extending transversely over said slide, said strap having a top section spaced slightly above the top wall of said slide intermediate said fasteners, and effective to limit upward movement of said slide from forces transmitted to said slide in the event of collision and to prevent bending of said flanges and the bottom walls of the channels at the lower edges of the side walls of said slide and thus to prevent separation of said slide from said track.

2. A construction as defined in claim 1 in which two tracks and slides are provided, and the seat is connected to both of said slides at opposite ends of said seat.

* * * * *